(12) United States Patent
Smith

(10) Patent No.: US 10,434,745 B2
(45) Date of Patent: Oct. 8, 2019

(54) GARAGE OIL MAT

(71) Applicant: Rickey Smith, Douglasville, GA (US)

(72) Inventor: Rickey Smith, Douglasville, GA (US)

( * ) Notice: Subject to any disclaimer, the term of this patent is extended or adjusted under 35 U.S.C. 154(b) by 76 days.

(21) Appl. No.: 15/472,842

(22) Filed: Mar. 29, 2017

(65) Prior Publication Data

US 2018/0162094 A1  Jun. 14, 2018

Related U.S. Application Data

(60) Provisional application No. 62/431,957, filed on Dec. 9, 2016.

(51) Int. Cl.
*B32B 3/10* (2006.01)
*B32B 5/18* (2006.01)
*B32B 25/04* (2006.01)

(52) U.S. Cl.
CPC ............... *B32B 5/18* (2013.01); *B32B 25/04* (2013.01); *B32B 2255/28* (2013.01); *B32B 2307/416* (2013.01); *B32B 2471/04* (2013.01)

(58) Field of Classification Search
None
See application file for complete search history.

(56) References Cited

PUBLICATIONS https://www.uline.com/Product/ProductDetailRootItem?modelnumber= H-3115 retrieved on Oct. 29, 2018.*
https://www.google.com/search?q=Hog+Heaven™+Nitrile+Mat+-+7/8"+thick%2C+3+x+5&rlz=1C1GCEA_enUS796US796&source= Int&tbs=cdr%3A1%2Ccd_min%3A1990%2Ccd_max%3A2010 &tbm=Retrieved on Oct. 29, 2018.*

* cited by examiner

*Primary Examiner* — Christopher M Polley

(57) ABSTRACT

A garage oil mat that provides easy clean-up for oil spills includes a top impermeable panel, a lower impermeable panel, a border, and a plurality of reflective strips. The top impermeable panel and the lower impermeable panel are connected to each other while the border is perimetrically connected around the top impermeable panel and atop the lower impermeable panel. The plurality of reflective strips is adjacently connected onto the top impermeable panel so that the reflective strips can function as visual indicators during daytime. The border is superimposed over with a high performance laminated photoluminescent film tape so that the high performance laminated photoluminescent film tape can function as a visual indicator during nighttime.

6 Claims, 7 Drawing Sheets

GARAGE OIL MAT

The current application claims a priority to the U.S. Provisional Patent application Ser. No. 62/431,957 filed on Dec. 9, 2016.

FIELD OF THE INVENTION

The present invention relates generally to garage oil mats. More specially, the present invention is a garage oil mat which can catch leaking oil to provide an easy clean-up of oil spills and includes reflective tapes and a glow in the dark border that provide visibility during both daytime and nighttime.

BACKGROUND OF THE INVENTION

Garage floor can typically be uncleaned and discolored as different types of vehicular fluids tend to spill on the garage floor during vehicular repairs. Different types of vehicular oils and other types of chemicals that are spilled on garage floor can be messy and difficult to clean up. People often use carpets, mats, or specifically designed garage mats to keep the garage floors clean. However, these need to be replaced when a substantial amount of oil and other chemical are absorbed overtime. Additionally, aforementioned cleaning apparatus do not provide any visual indication of new oil and new chemical spills as they get blend into uncleaned and discolored aforementioned cleaning apparatus. Therefore, the user is not aware of any new spills that may happen overnight or when the user is away from the garage. Additionally, aforementioned cleaning apparatus also fail to provide placement visibility on the garage floor during both daytime and nighttime.

It is therefore an objective of the present invention to provide a garage oil mat which can catch oil to provide an easy clean-up of oil spills, glow in the dark during nighttime, and provide visibility during daytime. The garage oil mat includes layers of different materials, wherein the top layer of the present invention is composed of a material that is waterproof and resistant to most chemicals, mold, and mildew. The top layer is also integrated with reflective tapes to provide additional visibility during daytime. The bottom layer is composed of a material that is chemical resistant and waterproof while providing comfort when walking on the present invention. The border is integrated with material which is able to glow in the dark to provide visibility of the present invention during nighttime. The top layer and the border are adjacently connected atop the bottom layer to form complete structure of the present invention.

DETAIL DESCRIPTIONS OF THE INVENTION

All illustrations of the drawings are for the purpose of describing selected versions of the present invention and are not intended to limit the scope of the present invention.

The present invention is a garage oil mat which can catch oil to provide an easy clean-up of oil spills. Additionally, the present invention also provides visual aids during daytime and nighttime so that the user is aware of the placement of the present invention with respect to the garage floor. In reference to FIG. 1, the present invention comprises a top impermeable panel 1, a lower impermeable panel 2, a border 3, and a plurality of reflective strips 6. The top impermeable panel 1 and the lower impermeable panel 2 are adjacently connected to each other so that the lower impermeable panel 2 and the top impermeable panel 1 are able to complete the overall structure of the present invention. The top impermeable panel 1 provides an aesthetic appearance to the garage oil mat and protects the garage floor while the lower impermeable panel 2 provides an additional level of protection against any oil spills. The border 3 is perimetrically encircled around the top impermeable panel 1 and delineates the boundaries of the present invention as the border 3 is connected to the top impermeable panel 1 and the lower impermeable panel 2. The plurality of reflective strips 6 is adjacently connected onto the top impermeable panel 1 and positioned opposite of the lower impermeable panel 2.

Figure 1:
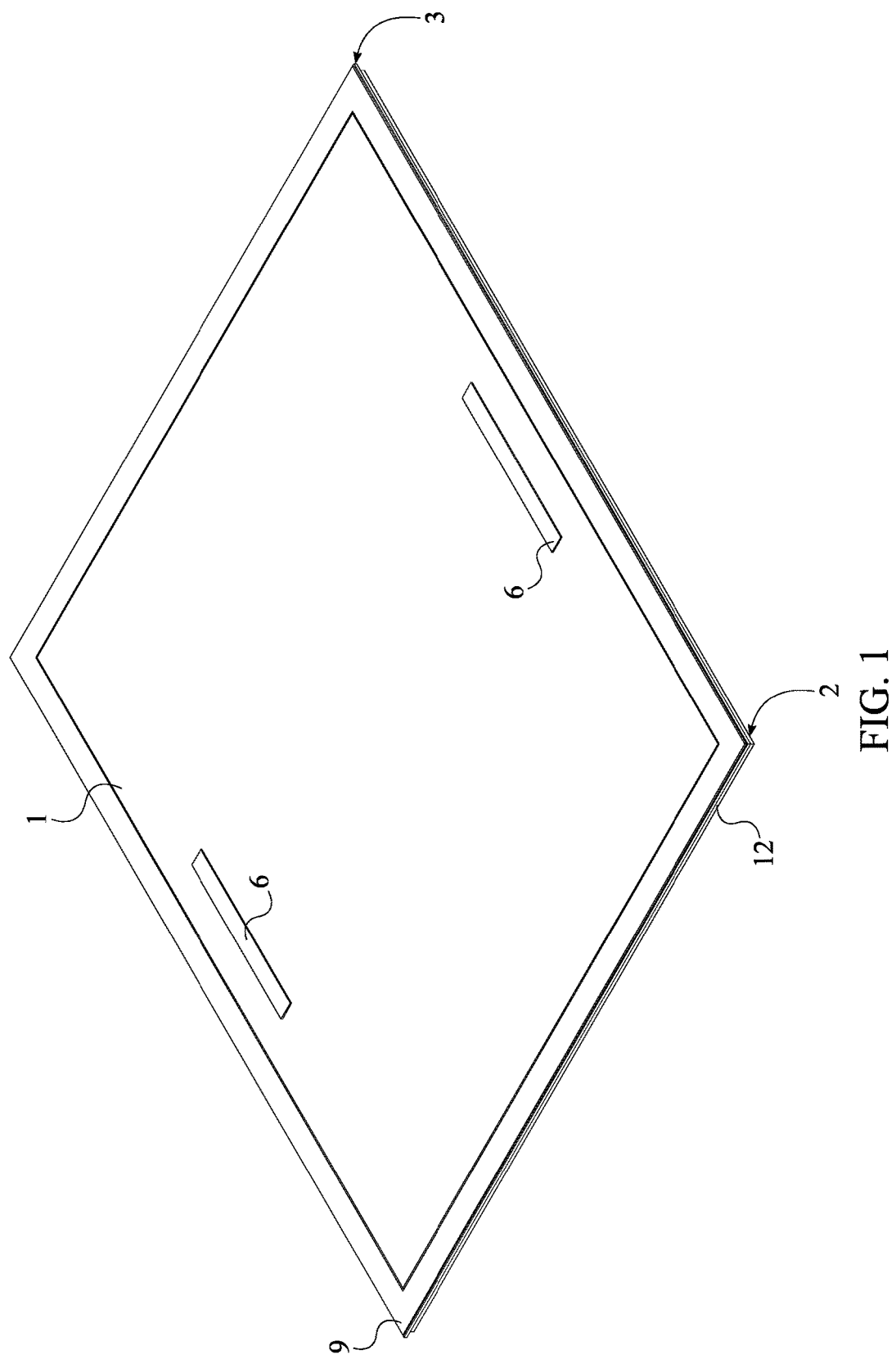
FIG. 1 is a perspective view of the present invention.
Figure 3:
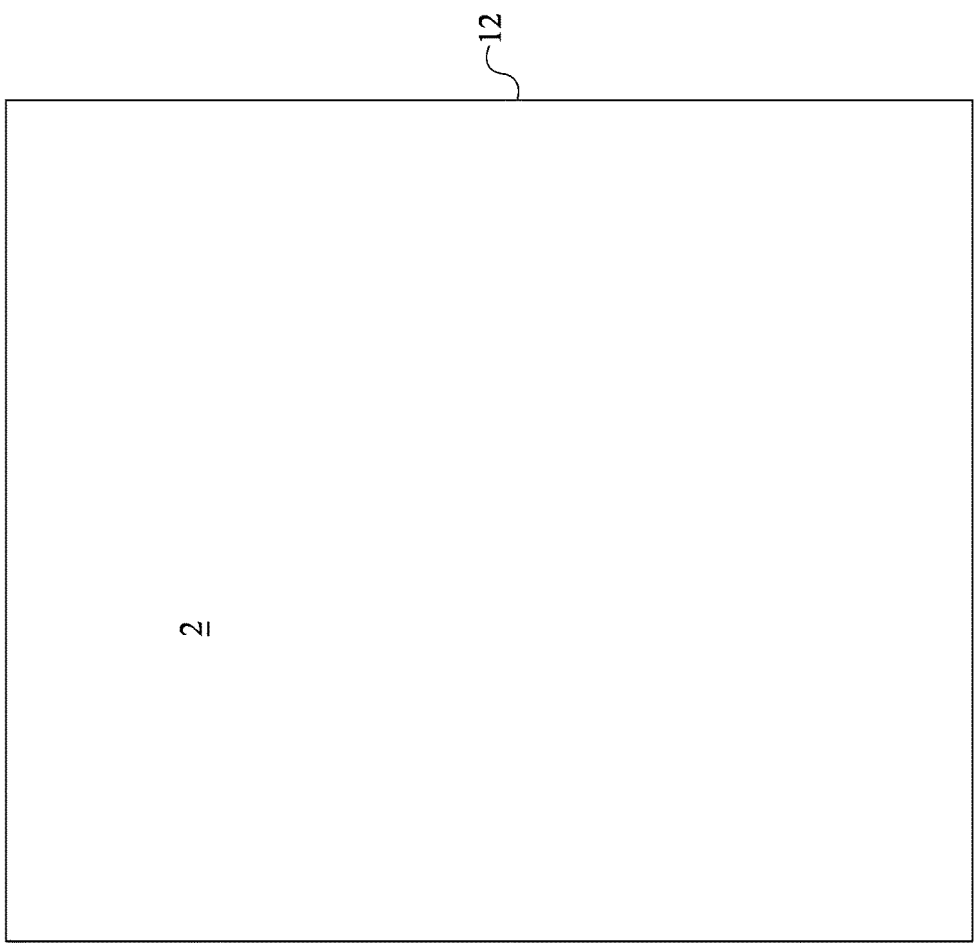
FIG. 3 is a bottom view of the present invention.

In reference to FIG. 1 and FIG. 3, the lower impermeable panel 2 can be any size and shape within the present invention. The lower impermeable panel 2 is resistant to chemical and composed of any material that is able to retain any oil or other chemicals which may pass through the top impermeable panel 1 if the top impermeable panel 1 is damage during the usage of the present invention. Preferably, the lower impermeable panel 2 is composed of close cell foam rubber wherein the composition of the lower impermeable panel 2 provides comfort when walking on top of the present invention. In the preferred embodiment of the present invention, the lower impermeable panel 2 is formed into a rectangular-shaped to represent a general shape of a mat.

Figure 2:
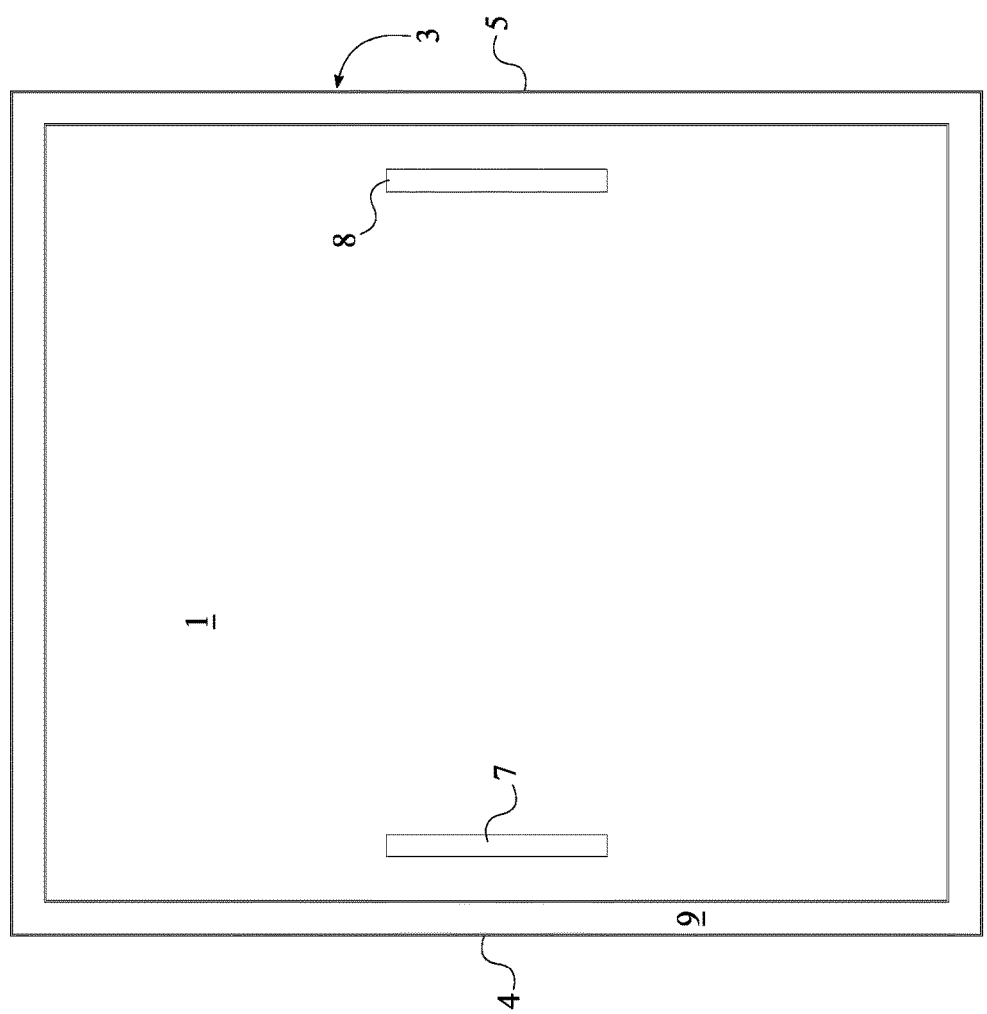
FIG. 2 is a top view of the present invention.

In reference to FIG. 1-2, the top impermeable panel 1 can be any size and shape within the present invention. However, the top impermeable panel 1 is preferably formed same shape as the lower impermeable panel 2 and slightly smaller than the lower impermeable panel 2 in order to accommodate placement of the border 3. The top impermeable panel 1 is resistant to chemicals, mold, and mildew. More specifically, the top impermeable panel 1 is able to capture oil and chemical spills where the user can easily clean the top impermeable panel 1 as the oil and chemical spills are easily visible to the user. Preferably, the top impermeable panel 1 is composed of sheet vinyl and may be any color and have any design. As a result of the vinyl construction, the top impermeable panel 1 is durable and easy to maintain as it can be cleaned with soap and water. In the preferred embodiment of the present invention, the top impermeable panel 1 is formed into a rectangular-shaped to match with the preferable shape of the lower impermeable panel 2.

Figure 4:
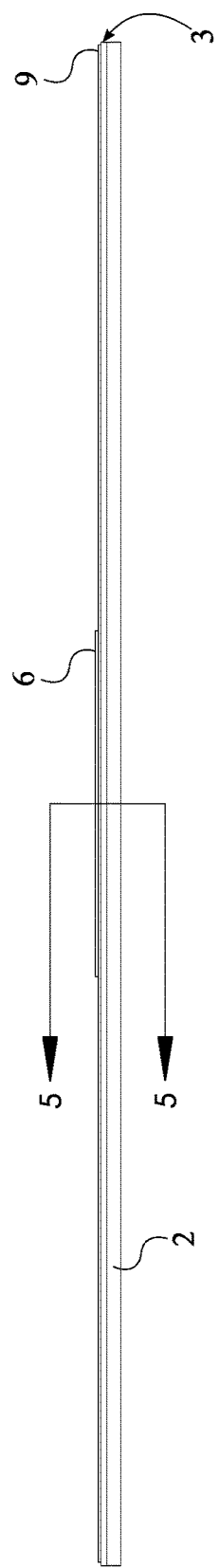
FIG. 4 is a side view of the present invention, showing the plane upon which a cross sectional view is taken shown in FIG. 5.

In reference to FIG. 4, the top impermeable panel 1 is positioned on top of the lower impermeable panel 2 internally connected to each other. More specifically, the top impermeable panel 1 is adhered to the lower impermeable panel 2 using a chemical resistant glue and then pressed together for a predetermined period of time to fully bond. Since the top impermeable panel 1 and the lower impermeable panel 2 are fully connected to each other, the top impermeable panel 1 does not move independent of the lower impermeable panel 2.

Figure 5:
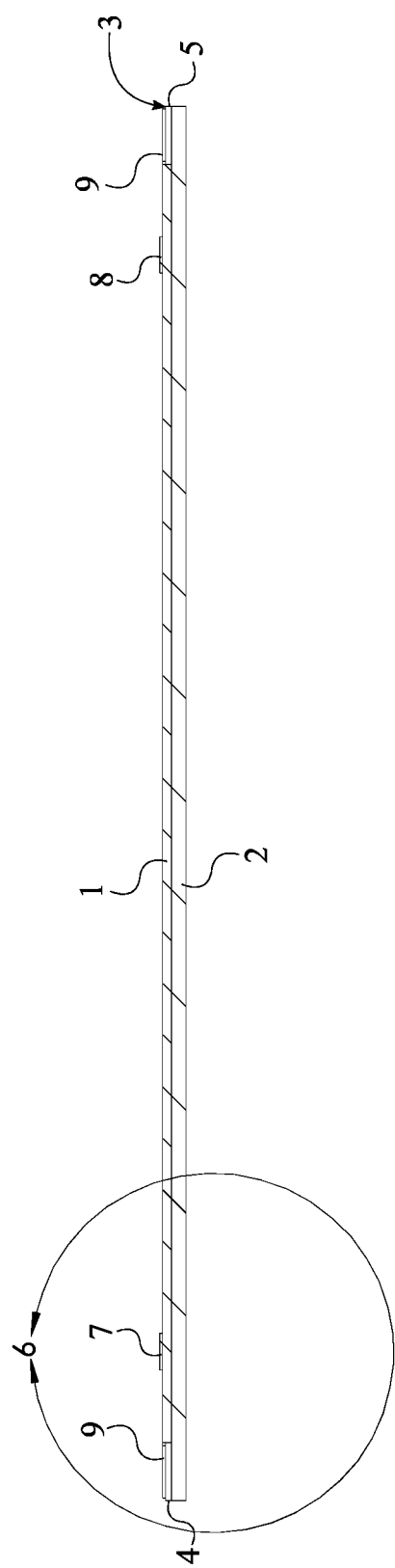
FIG. 5 is a cross section view of the present invention taken along line 5-5 of FIG. 4, wherein a detailed view section is shown in FIG. 6.
Figure 6:
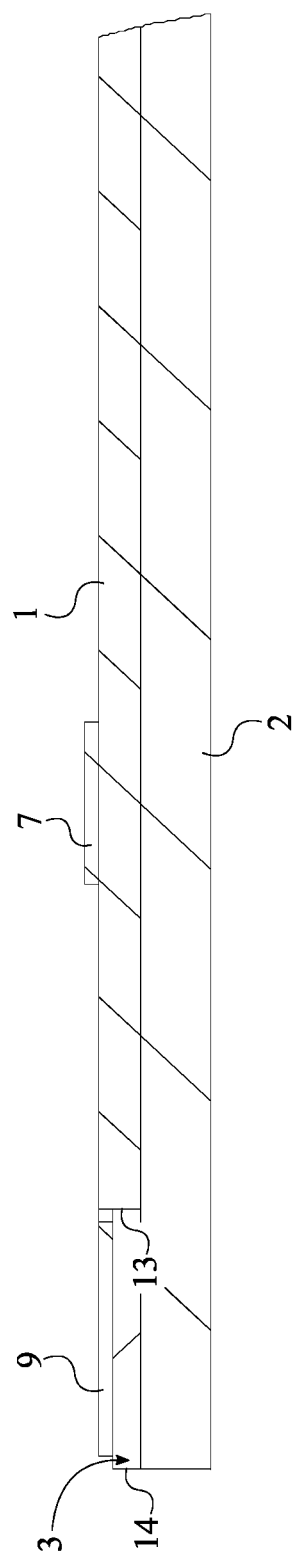
FIG. 6 is a detailed view of the present invention taken along section 5 of FIG. 5.

In reference to FIG. 5-6, the border 3 is perimetrically positioned and connected around the top impermeable panel 1 to delineates the exterior boundaries of the present invention while a bottom surface of the border 3 is connected atop the lower impermeable panel 2. More specifically, an inner edge 13 of the border 3 is laterally connected to the top impermeable panel 1 so that the outer edge 14 of the top impermeable panel 1 is able to connect with the inner edge 13 of the border 3. As a result, an outer edge 14 of the border 3 is coincidentally positioned to an edge 12 of the lower impermeable panel 2.

In reference to FIG. 2, the plurality of reflective strips 6 comprises a first reflective strip 7 and a second reflective strip 8. The first reflective strip 7 and the second reflective strip 8 are diametrically opposed of each other and preferably positioned adjacent to the border 3. More specifically, the first reflective strip 7 is positioned parallel to a first edge 4 of the border 3. The second reflective strip 8 is positioned parallel to a second edge 5 of the border 3. The plurality of reflective strips 6 can be any shape and size; however, the plurality of reflective strips 6 is preferably formed into a rectangular-shaped. The plurality of reflective strips 6 is composed of microprismatic retroreflective conspicuity tape so that the plurality of reflective strips 6 can functions as a visual indicator during daytime.

Figure 7:
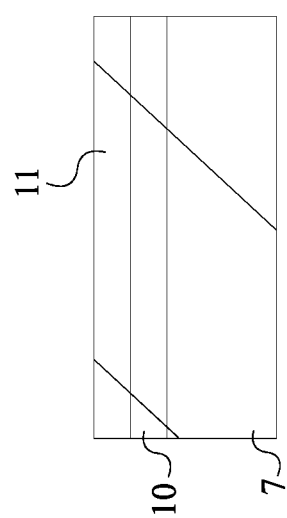
FIG. 7 is a shamanic view showing the UV coating and the impermeable coating atop each of the plurality of reflective strips.

The plurality of reflective strips 6 enhances the visibility of the garage oil mat during the day. In reference to FIG. 7, each of the plurality of reflective strips 6 comprises an ultraviolet (UV) coating 10 and an impermeable coating 11. More specifically, the UV coating 10 is superimposed over each of the plurality of reflective strips 6 to protect the durability of the plurality of reflective strips 6. The impermeable coating 11 is then superimposed over the UV coating 10 for each of the plurality of reflective strips 6, wherein the impermeable coating 11 protects the UV coating 10 and each of the reflective strips 6 from any types of solvents. In the preferred embodiment of the present invention, the plurality of reflective strips 6 only comprises two strips as the two strips are mirrored across the centerline of the top impermeable panel 1 and positioned parallel to the first edge 4 and the second edge 5. However, the quantity of plurality of reflective strips 6 within the present invention is not limited to two and can be any other quantity as the final embodiment desires.

In reference to FIG. 6, a high performance laminated photoluminescent film tape 9 is superimposed over the border 3 so that the present invention can visually represent the border 3 in darkness. More specifically, photoluminescent pigments of the high performance laminated photoluminescent film tape 9 absorb and store energy from normal and ambient light. The border 3 is then visible, in darkness, after exposure to a light source. When the photoluminescent pigments are fully charged, the border 3 can be visually represented for at least ten hours through the high performance laminated photoluminescent film tape 9.

In an alternative embodiment of the present invention, the present invention may comprise a lip that is perimetrically connected around the border 3. More specifically, the lip is perpendicularly positioned to the border 3 and extends a predetermined height, encircling the top impermeable panel 1. When the present invention face with a large quantity of oil spill, the lip is able to retain the quantity of oil that has been spilled onto the top impermeable panel 1. Resultantly, the present invention collects the quantity of oil within the top impermeable panel 1 and the lip thus keeping the garage floor completely clean.

Although the invention has been explained in relation to its preferred embodiment, it is to be understood that many other possible modifications and variations can be made without departing from the spirit and scope of the invention as hereinafter claimed.

What is claimed is:

1. A garage oil mat comprises:
   a top impermeable panel;
   a lower impermeable panel;
   a border;
   a plurality of reflective strips;
   a high performance laminated photoluminescent film tape;
   the high performance laminated photoluminescent film tape being superimposed over the border;
   the top impermeable panel and the lower impermeable panel being adjacently connected to each other;
   the border being perimetrically encircled around the top impermeable panel;
   the border being connected to the top impermeable panel and the lower impermeable panel; and
   the plurality of reflective strips being adjacently connected on the top impermeable panel, opposite of the lower impermeable panel.

2. The garage oil mat as claimed in claim 1, wherein each of the plurality of reflective strips being a microprismatic retroreflective conspicuity tape.

3. The garage oil mat as claimed in claim 1 comprises:
   the plurality of reflective strips comprises a first reflective strip and a second reflective strip;
   the first reflective strip and the second reflective strip being diametrically opposed of each other;
   the first reflective strip being positioned parallel to a first edge of the border; and
   the second reflective strip being positioned parallel to a second edge of the border.

4. The garage oil mat as claimed in claim 1 comprises:
   an ultraviolet (UV) coating;
   an impermeable coating;
   the UV coating being superimposed over each of the plurality of reflective strips; and
   the impermeable coating being superimposed over the UV coating for each of the plurality of reflective strips.

5. The garage oil mat as claimed in claim 1 comprises:
   an inner edge of the border being laterally connected to the top impermeable panel; and
   an outer edge of the border being coincidentally positioned to an edge of the lower impermeable panel.

6. The garage oil mat as claimed in claim 1, wherein the lower impermeable panel being a close cell foam rubber.

* * * * *